June 25, 1929.  R. BULLIS  1,718,774
HAY COCKING MACHINE
Filed June 25, 1926   3 Sheets-Sheet 1
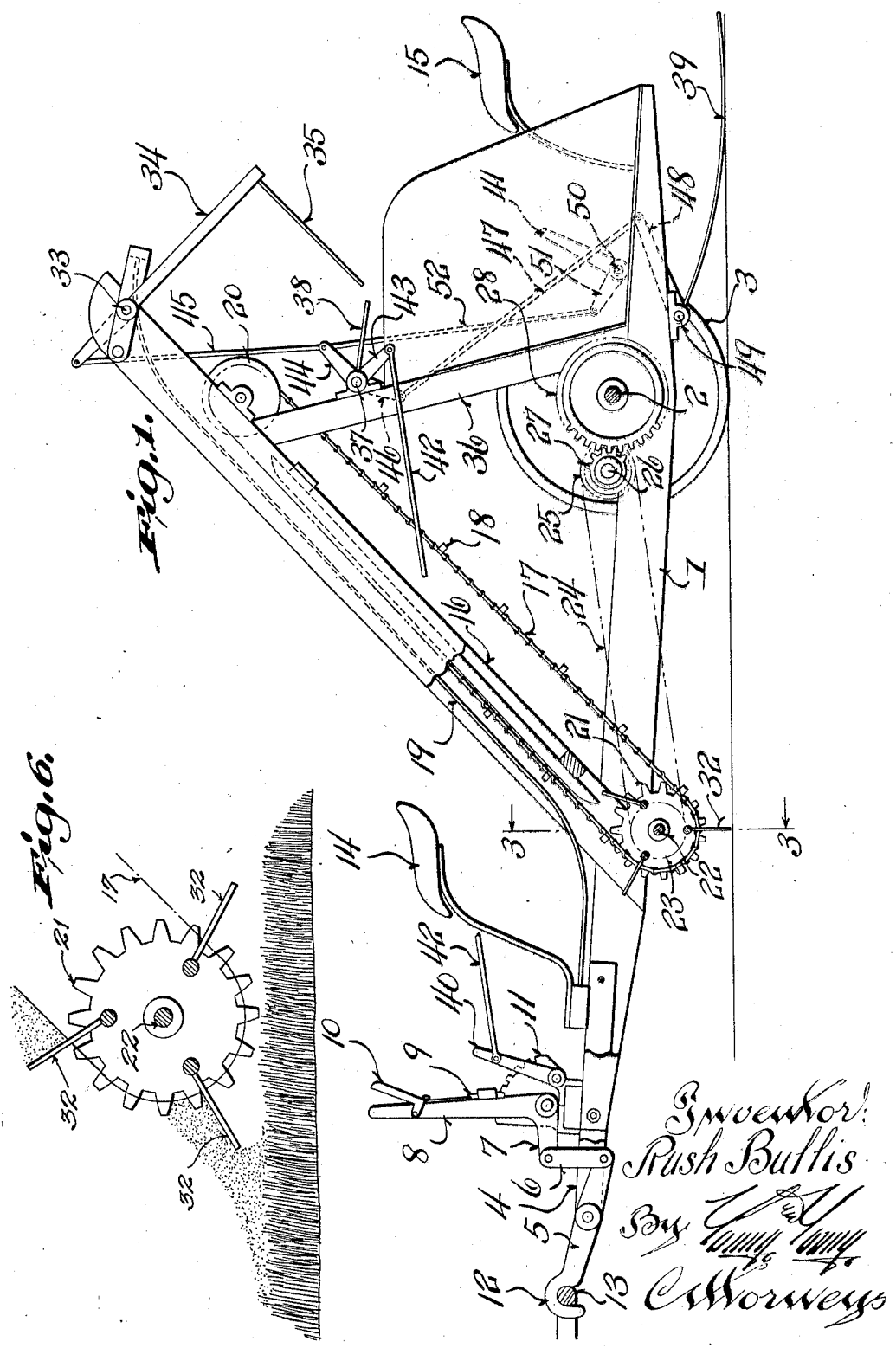

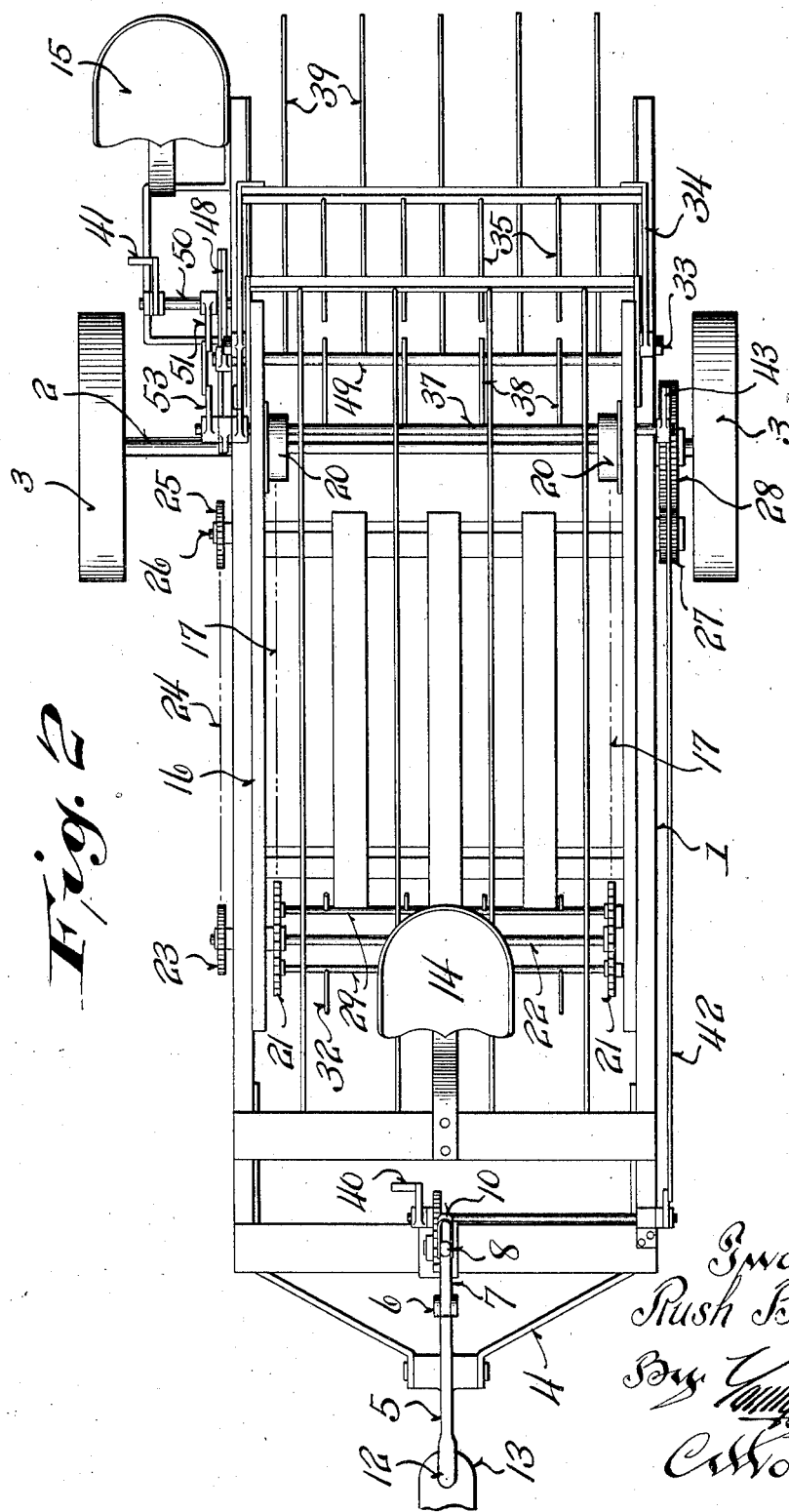

June 25, 1929. R. BULLIS 1,718,774
HAY COCKING MACHINE
Filed June 25, 1926 3 Sheets-Sheet 3
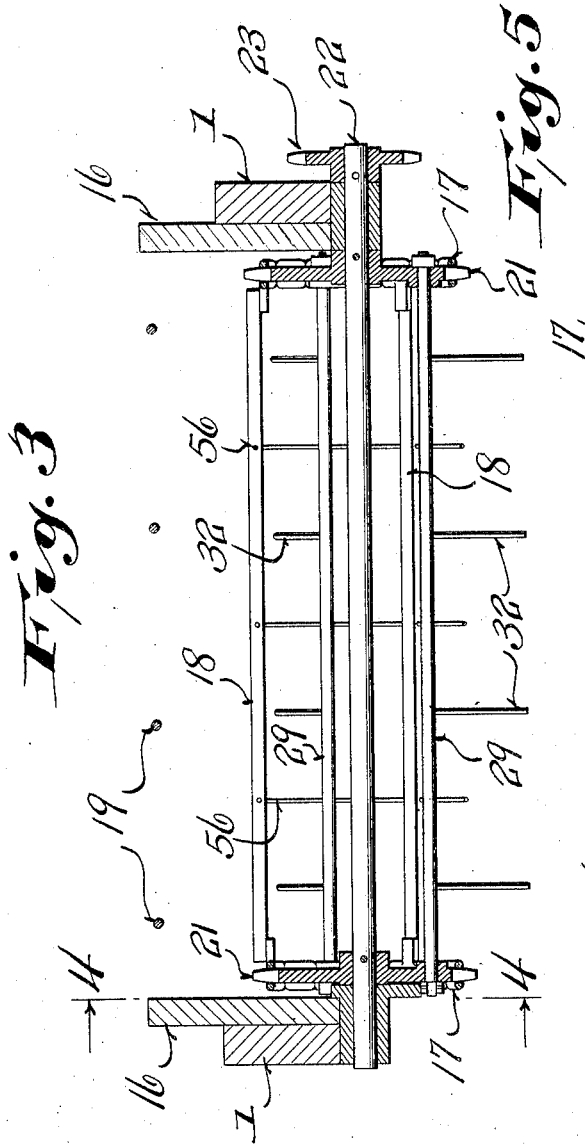
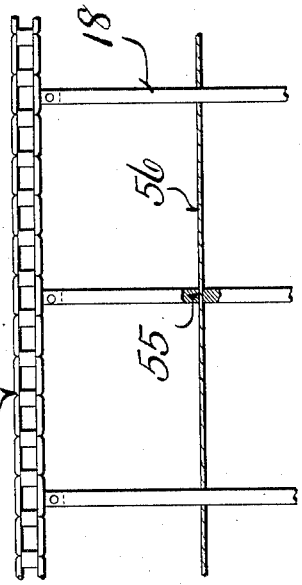
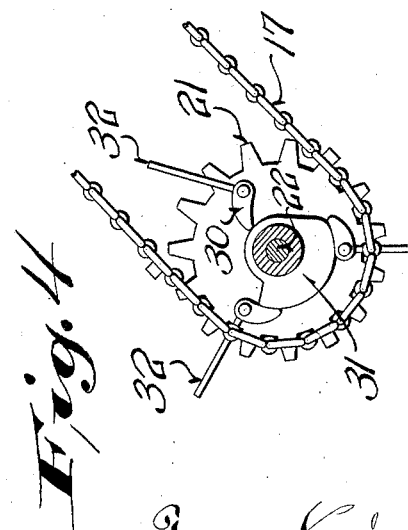
Inventor:
Rush Bullis Patented June 25, 1929.

1,718,774

UNITED STATES PATENT OFFICE.

RUSH BULLIS, OF EAU CLAIRE, WISCONSIN.

HAY-COCKING MACHINE.

Application filed June 25, 1926. Serial No. 118,431.

This invention relates to hay cocking machines.

Objects of this invention are to provide a novel form of hay cocking machine which is so constructed that it will shape the hay into a sharply defined, compact pile or hay cock, and will deposit all of the hay at a single time.

Further objects are to provide a novel form of hay cocking machine in which the hay is elevated and temporarily held until the desired amount has accumulated, and to provide means for discharging such hay to the bottom holding means, with the bottom holding means so controlled that all of the hay may at a single time be readily discharged in a compact form.

Further objects are to provide controlling means for the machine which may be actuated either from the front of the machine or from the rear thereof in a simple and easy manner.

Further objects are to provide means for controlling the height at which the hay cocking machine will operate so that the machine may be readily attached to the drawbar or similar part of a tractor, for example, and the exact height at which the machine will operate may be readily controlled.

An embodiment of the invention is shown in the accompanying drawings in which:

Figure 1 is a side elevation partly in section of the machine;

Figure 2 is a plan view thereof;

Figure 3 is a sectional view on the line 3—3 of Figure 1;

Figure 4 is a sectional view on the line 4—4 of Figure 3;

Figure 5 is an enlarged fragmentary view of the conveyor.

Figure 6 is a detailed section showing how the hay is moved upwardly from the ground.

Referring to the drawings it will be seen that the machine comprises a main frame, indicated generally by the reference character 1, which is carried by a transverse rear axle 2 equipped with wheels 3. The front of the frame rigidly carries forwardly projecting diagonal bars 4 between which the front supporting lever 5 is pivoted. This lever has its rear end connected by means of a link 6 with the forward end 7 of a bell crank lever. The other portion of the bell crank lever, indicated by the reference character 8, extends upwardly adjacent the front of the machine, and is provided with a locking plunger 9, controlled by a hand lever 10, and adapted to lock into any one of the notches formed in the segmental rack 11, to thus determine the angle at which the lever 5 is set. The forward end of the lever 5 is provided with a hook 12 adapted to engage over the drawbar 13 of a tractor, and through the medium of the hand lever 8, and the mechanism described above, to control the elevation of the front of the machine and to thus control the height at which the machine will operate.

The machine is provided with a front seat 14 and a rear seat 15.

The machine is provided with an upwardly and rearwardly inclined chute, indicated generally by the reference character 16. This chute is equipped with a plurality of slats and with side walls, as shown in Figures 1 and 2. Upon this chute an endless chain 17 is adapted to travel, such chain enclosing the bottom or rear wall of the chute and being provided with a plurality of projections or slats 18, adapted to engage the hay after it has been handed or supplied to the chute by the mechanism to be described. In order to prevent the hay from blowing away while it is passing upwardly along the chute, a plurality of spaced retaining rods 19 are provided, and are supported out of contact with the conveyor 17, as shown most clearly in Figure 1. The conveyor is carried by drums or sprocket wheels 20 at its upper end, and by sprocket wheels 21 at its lower end. The sprocket wheels 21 are mounted upon a transverse jack shaft 22 which is also equipped with a sprocket wheel 23. The latter sprocket wheel 23 is connected by means of a chain 24 with a sprocket wheel 25 carried by a jack shaft 26. This last shaft carries a small gear 27 which meshes with the gear 28, as shown in Figure 1 carried upon the rear shaft 2. Thus, when the wheels 3, commonly known as bull wheels, rotate, the gears 28 and 27 transmit motion to the shaft 22 by means of the sprocket wheels and chain described and, consequently, the conveyor 17 is caused to operate.

Arranged between the sprocket wheels 21 are the rods 29, the ends of which are rotatably mounted within the sprocket wheels and arranged circumferentially as shown in Figure 4. The shaft or rods 29 are provided with cam followers 30 which ride upon a fixed cam 31, as shown in Figure 4. This cam thus controls the motion of the rods or shaft 29. These shafts carry projecting prongs 32 which extend outwardly beyond the conveyor, as shown in Figures 1 and 4.

However, as the gears 21 rotate, the cam causes the followers 30 to rock the prongs 32 inwardly so that they withdraw as they pass through the conveyor and, consequently, slide away from the hay deposited upon such conveyor. In other portions of the rotation of the gears 21, the prongs extend radially outwardly and thus rake up the hay and deliver it to the conveyor.

Adjacent the upper portion of the chute 16, an upper rock shaft 33 is mounted and carries a frame 34, which is provided with a plurality of inwardly directed hay receiving prongs 35. At a point below the conveyor, preferably upon the diagonal braces 36, a second transverse rock shaft 37 is mounted and carries a plurality of hay receiving prongs 38 which cooperate with the prongs 35.

The hay is deposited upon the prongs 35 and 38 from the conveyor 17 and accumulates in this portion of the machine. When a sufficient quantity of hay has collected, the prongs are moved apart by rocking the shafts 33 and 37. This allows the hay to fall downwardly upon a series of trailing or dragging prongs 39 which have at this time been elevated from the position shown in Figure 1. These prongs 39 thus receive the entire amount of collected hay upon proper motion of mechanism hereinafter described. The prongs 39 are lowered into the position shown in Figure 1, and the hay slides off in a compact and even form.

The means for rocking the shafts 37 and 33 will now be described. This means is controlled either from a forwardly located foot lever 40, or from a rearwardly located foot lever 41. The lever 40 is connected by means of a rod or link 42 with a lever 43 rigidly mounted upon the rock shaft 37. This rock shaft 37 is provided with a lever 44 which is connected by means of a link 45 with the frame 34, as shown in Figure 1. Further the rock shaft 37 is provided with a lever 46 connected by means of a link 47 with a lever 48 mounted upon the transverse shaft 49 to which the prongs 39 are attached. Thus, motion of the front lever 40 is transmitted to the prongs 35 and 38 and causes them to move apart. Further, this motion is transmitted to the prongs 39, and causes such prongs to rise. When the lever 40 is allowed to resume its original position, the prongs 39 are lowered to discharge the hay from the machine, and the prongs 35 and 38 move towards each other in hay receiving position, as shown in Figure 1.

In order to operate the hay controlling mechanism from adjacent the rear seat 15, the foot lever 41 is rigidly connected to a shaft 50. This shaft rigidly carries a lever 51 which is connected by means of a link 52 to a lever 53 (see Figure 2) rigidly mounted upon the shaft 37.

Thus the operator is enabled to control the discharge of hay either from the front or the rear of the machine. Further, the operator is enabled to control the height at which the machine will function by means of the hand lever 8.

It may be found desirable, as stated previously, to provide the conveyor, indicated generally by the reference character 17, with a plurality of transverse slats 18 (see Figure 5). These slats are preferably apertured at regular intervals, as indicated at 55, and receive a flexible cord or rope 56.

It is to be noted further that this machine may be readily constructed and may be easily handled and controlled.

It is to be noted particularly that the supporting fingers 39 for the lower pivotally mounted frame are concave upwardly and thus provide a support for the hay cock which prevents rocking of the hay cock. Further, when these fingers are lowered, they do not scrape upon the ground merely at their outer ends, but contact with the ground throughout a material portion of their extent, as shown in Figure 1, and thus allow the hay cock to slide off without any tilting or rocking whatsoever. This insures a correctly formed hay cock.

It is to be noted also that the peculiar arrangement of elevating means for placing the hay upon the conveyor enables this means to engage the hay from its underside and gently elevate it and place it upon the conveyor. This is particularly desirable for the reason that hay, particularly alfalfa or legume hay, when dry, has relatively brittle and easily detached leaves. However, the ground side of the hay is almost always somewhat moist and thus by engaging the hay from its underside, breaking of these brittle portions is wholly avoided and the hay is lifted upwardly somewhat as a blanket, or in other words, in a relatively undisturbed state and placed upon the conveyor. It is gently held upon the conveyor by the guiding rods and carried to the upper portion of the machine. Further than this, the hay does not fall the full height of the machine, but drops first to the intermediate frames and subsequently is discharged from there to the lower fingers.

It will be seen therefore that this machine will handle the hay without any breaking or damage to the hay, irrespective of the fact that the hay may be very brittle or dry on its upper side and through a good part of its depth.

It will be seen further that by means of the two hay receiving devices that the accumulation of hay may be easily secured while all of the hay so accumulated, may be discharged at a single time to thus form a compact, evenly shaped hay cock.

Although the invention has been described in considerable detail, such description is intended as illustrative rather than limiting as the invention may be variously embodied and as the scope of such invention is to be determined as claimed.

I claim:

1. A hay cocking machine, comprising a body portion having a pair of supporting wheels and having means adjacent its front for attachment to a draft device, said machine having an upwardly and rearwardly slanting conveyor for elevating the hay, means for picking up the hay from its underside and delivering the hay to said conveyor, a pair of pivotally mounted frames adjacent the upper portion of said conveyor and having arms for the reception of the hay delivered from said conveyor, a second pivotally mounted frame located adjacent the rear lower portion of said machine and operatively connected to said first mentioned set of frames, means for operating said frames to discharge the hay from the upper set of frames to the lower frame and for lowering the lower frame to allow the hay to slide therefrom, said second frame having upwardly concave fingers.

2. A hay cocking machine, comprising a body portion having a pair of supporting wheels and having means adjacent its front for attachment to a draft device, said machine having an upwardly and rearwardly slanting conveyor for elevating the hay, means for picking up the hay from its underside and delivering the hay to said conveyor, a pair of pivotally mounted frames adjacent the upper portion of said conveyor and having arms for the reception of the hay delivered from said conveyor, a second pivotally mounted frame located adjacent the rear lower portion of said machine and operatively connected to said first mentioned set of frames, means for operating said frames to discharge the hay from the upper set of frames to the lower frame and for lowering the lower frame to allow the hay to slide therefrom, and means operable from the front and rear of the machine for controlling the frame operating means.

3. A hay cocking machine comprising a body portion having a pair of supporting wheels and having means adjacent its front for attachment to a draft device, said machine having an upwardly and rearwardly slanting conveyor for elevating hay, means for directly engaging the hay at its lower side and subsequently elevating the hay and placing the hay upon the conveyor, a pair of pivotally mounted frames located below the upper rear end of said conveyor and adapted to rock outwardly in opposite directions and to normally support the hay delivered from the conveyor, a lower pivotally mounted frame positioned below said first mentioned frames and having curved elongated fingers to form a concave support, means connecting said frames, whereby when said upper frames are moved apart said lower frame is raised, manually operated mechanism for controlling said means, and guiding rods mounted above said conveyor for holding the hay upon said conveyor.

In testimony that I claim the foregoing I have hereunto set my hand at Eau Claire, in the county of Eau Claire and State of Wisconsin.

RUSH BULLIS.